United States Patent [19]

Hoffman et al.

[11] Patent Number: 5,730,240
[45] Date of Patent: Mar. 24, 1998

[54] HOOD CONTROL APPARATUS

[75] Inventors: Lawrence A. Hoffman, Hoagland; James J. Tosconi, Fort Wayne, both of Ind.; Troy R. Schumm, Convoy, Ohio

[73] Assignee: Navistar International Transportation Corp., Chicago, Ill.

[21] Appl. No.: 553,115

[22] Filed: Nov. 7, 1995

[51] Int. Cl.⁶ .................................................... B62D 25/10
[52] U.S. Cl. ........................................ 180/69.21; 180/68.4
[58] Field of Search ............................ 180/69.21, 69.2, 180/89.14, 89.17, 68.4; 296/76, 146.8; 49/394, 395; 248/161, 354.6, 565, 631

[56] References Cited

U.S. PATENT DOCUMENTS

| | | | |
|---|---|---|---|
| 2,844,348 | 7/1958 | Jordan | 248/354.6 |
| 3,017,944 | 1/1962 | Norrie | 180/69 |
| 3,232,368 | 1/1966 | Sullivan | 180/69 |
| 3,419,099 | 12/1968 | Brumbaugh et al. | 180/69 |
| 3,754,613 | 8/1973 | Stephens et al. | 180/69 C |
| 4,263,978 | 4/1981 | Jackson | 180/69.21 |
| 4,281,733 | 8/1981 | Miller et al. | 180/69 C |
| 4,566,552 | 1/1986 | Hoffman et al. | 180/69.21 |
| 4,938,520 | 7/1990 | Shelton | 296/76 |
| 4,991,675 | 2/1991 | Tosconi et al. | 180/69.21 |

FOREIGN PATENT DOCUMENTS

| 195187 | 8/1989 | Japan | 296/76 |
|---|---|---|---|

*Primary Examiner*—Brian L. Johnson
*Assistant Examiner*—Gary Savitt
*Attorney, Agent, or Firm*—Dennis K. Sullivan

[57] ABSTRACT

A hood control apparatus includes a single dampening cylinder disposed along a fore-aft centerline of a forward tilting hood, one end of the cylinder being pivotably attached to the hood and another end pivotably engaging a mounting bracket for same engaged to an under hood cooling package frame in a manner to maintain the cylinder above the cooling package components at all times. A spring-loaded locking mechanism may be provided to automatically prevent retraction of the dampening cylinder when the hood is in a fully open position until it is desired to close the hood.

8 Claims, 2 Drawing Sheets

HOOD CONTROL APPARATUS

BACKGROUND OF THE INVENTION

The present invention relates to a medium and heavy duty trucks or busses of the type having a hood which encloses the engine compartment and which is pivotally mounted to the frame of the engine so that the hood opens forwardly of the vehicle to expose the engine and radiator and, more particularly, to apparatus for controlling and dampening the motion of the hood between its open and closed positions wherein a single dampening cylinder assembly of the type having a rod slidably disposed in a cylindrical housing extends between the hood and the radiator frame. In a second embodiment, the dampening cylinder also includes a device for locking the hood in the open position.

THE PRIOR ART

The dynamic motion of opening and closure of a forward tilting truck cab hood has always presented challenging issues. Strong gusts of wind from the front of the vehicle have at times resulted in inadvertent hood closure, causing damage to underlying components when a hood closes quickly. Furthermore, the individual opening or closing the hood must maintain manual control of the hood until the hood is either completely open or completely closed. Without such control, the hood would translate a large shock load, by means of its own weight, to an under hood cooling package frame through stop cables, or to cab mounted hood receptacles, as presently used.

Others have provided hood tilt assemblies wherein the hood motion is controlled by counterbalancing springs and/or dampening cylinders as shown in the following U.S. Pat. Nos.

| U.S. Pat. No. | Patentee |
| --- | --- |
| 3,017,944 | R. C. Norrie |
| 3,232,368 | J. T. Sullivan |
| 3,419,099 | Brumbaugh et al. |
| 3,754,613 | Stephens et al. |
| 4,281,733 | Miller et al. |
| 4,566,552 | Hoffman et al. |
| 4,991,675 | Tosconi et al. |

In the Miller reference, two dampening cylinders are used which are attached to the outer sides of the radiator supports. In the Hoffman et al. reference, a single dampening cylinder is attached to the outer side of the left radiator support. With a single dampening cylinder, the dampening load produces a twisting force on the hood which is resisted by the hood mounting pivots. Two cylinders increase the cost. It is also known to provide a separate device connected between the frame and the hood for locking the hood in an open position.

SUMMARY OF THE INVENTION

Accordingly, it is a primary object of the invention to provide a hood control apparatus which assists in tilting of the hood and which operates against a selectively resistive force during opening and closing of the hood.

A more particular object of the invention is to accomplish the above using a single centerline mounted stop assembly per hood.

It is a further desired objective to provide a secondary embodiment wherein the dampening cylinder includes a locking mechanism to maintain the hood in the open position until it is desired to close same.

These and other objectives are specifically met by the hood control apparatus of the present invention which includes a single rod and cylinder arrangement pivotally mounted along a centerline of the hood, between the hood and a mounting bracket which is seated on the top of a chassis mounted cooling frame in a manner to maintain the stop assembly above the frame mounted cooling package components at all times, the rod being placed under a resistive force as it is extended from the cylinder. A single rod and cylinder combination is used, and is pivotably attached at one end to the hood along a centerline thereof, with another end thereof pivotably engaging a chassis mounted cooling frame. In an alternate embodiment of the dampening cylinder, a spring-loaded locking mechanism is provided to keep the rod fully extended thereby maintaining the hood in a fully open position until it is desired to close the hood.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT(S)

Figure 1:
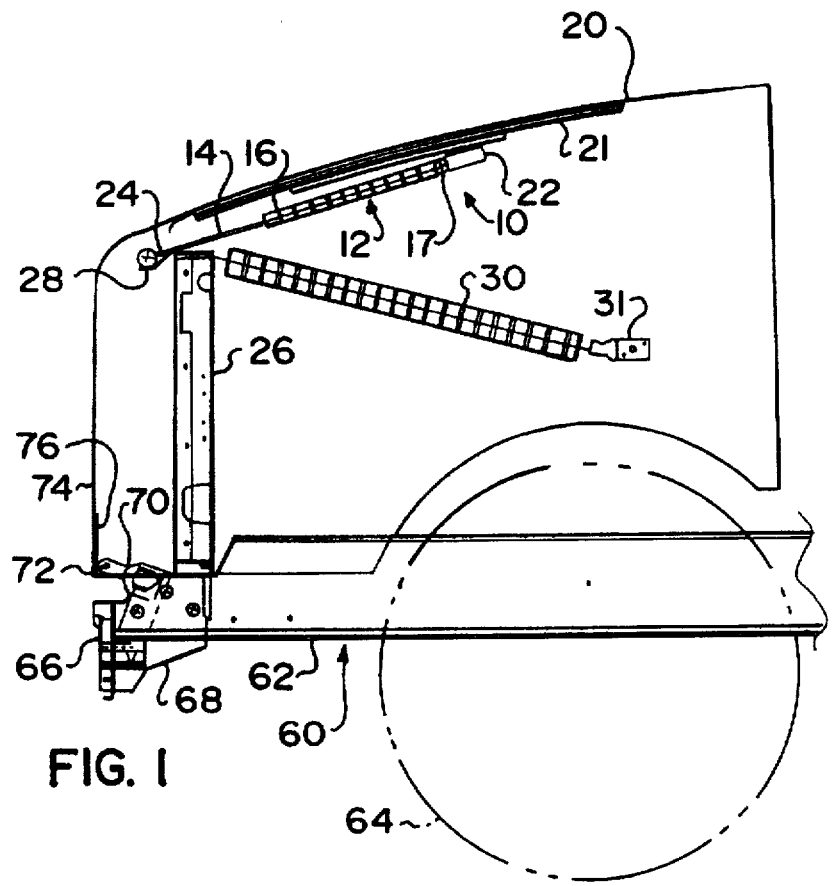
FIG. 1 is a side view through a closed truck hood, which is illustrated as if it were transparent, showing the hood control apparatus of the present invention engaged between the hood and a mounting bracket secured to a chassis mounted cooling package frame located inside the hood.

Referring now to the drawings in greater detail, there is illustrated in the drawings a forward portion of a truck generally identified as 60 of the type having framework including a pair of transversely spaced frame rails 62 supported by wheels 64 in a conventional manner. The forward ends of the frame rails 62 are connected by a front bracket 66 which supports the front bumper (not shown) of the truck 60. A pivot bracket assembly 68 is secured to the rear portion of the front bracket 66 between the frame rails 62 and adjustably supports a pair of laterally spaced pivot brackets 70 to provide a horizontal transverse pivot axis 72. A vehicle hood 20 (shown with its skin transparent in the drawings) is provided at its forward lowermost wall 74 with hinge plates 76 which are pivotally mounted to the pivot brackets 70 so that the hood 20 may swing upwardly and forwardly about the pivot axis 72 between open and closed positions as shown in FIG. 3 to thereby expose the engine compartment of the truck.

Figure 2:
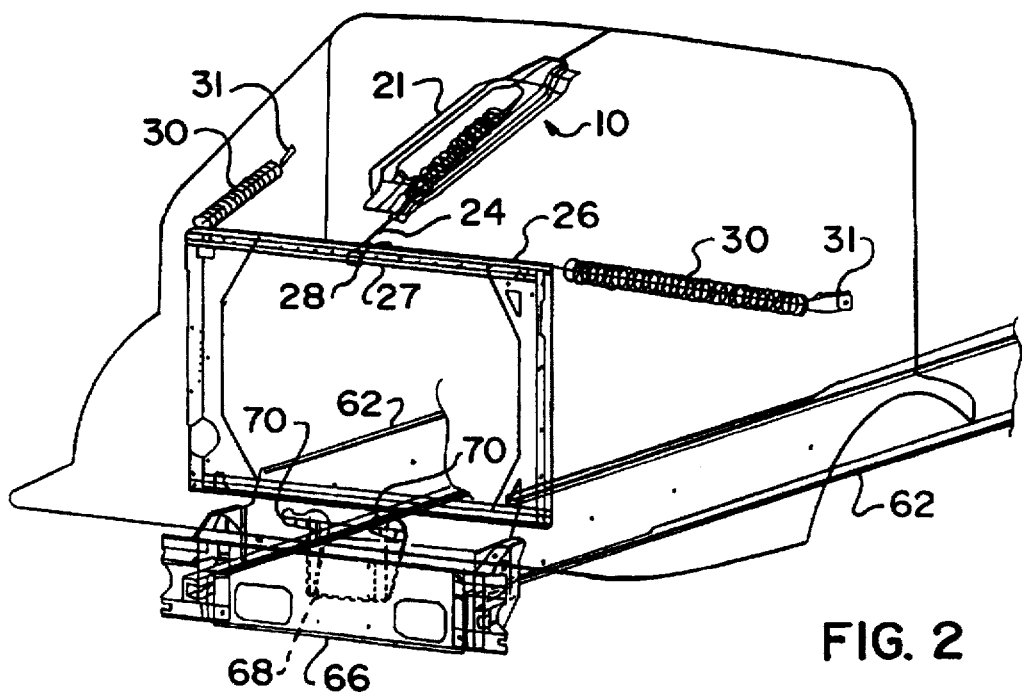
FIG. 2 is a front perspective view showing of the hood of FIG. 1.

In accordance with the invention, as shown in FIGS. 1 and 2, a hood control apparatus generally identified by the reference numeral 10, is provided for controlling the motion of the hood 20. As shown, the hood control apparatus 10 comprises a dampening cylinder or dashpot 12, of the type described in U.S. Pat. No. 4,566,552, having a rod 14 being slidably engaged within a cylinder 16. A free end 17 of the cylinder 16 is pivotably engaged to a vehicle hood 20 by a pivotal mounting bracket 22 attached to an integral longitudinal hood reinforcement member 21 extending along a centerline of the hood 20. A free end 24 of the rod 14 is pivotably engaged to a mounting bracket 28 secured to the upper center portion 27 of a transversely extending cooling package frame assembly 26 which is secured in an upright fixed position to the frame rails 62 to support the vehicle radiator, charge air cooler, and air conditioning condenser (not shown). The mounting bracket 28 is designed such that, when the hood 20 is closed, the damping cylinder 12 remains above the level of the cooling frame 26. The mounting 22 mounting bracket and 28 are located relative to each other and the pivot axis 72 in a manner such that, when the hood 20 is closed, the rod 14 is less than fully extended out of the cylinder 16, for reasons to become apparent hereinafter, that full extension of the rod 14 takes place when the hood 20 is tilted open through approximately 70° of tilt from the closed position thereof, and less than full retraction of the rod 14 occurs in intermediate positions of the hoods, such full retraction possibly preventing travel of the hood 20.

Figure 3:
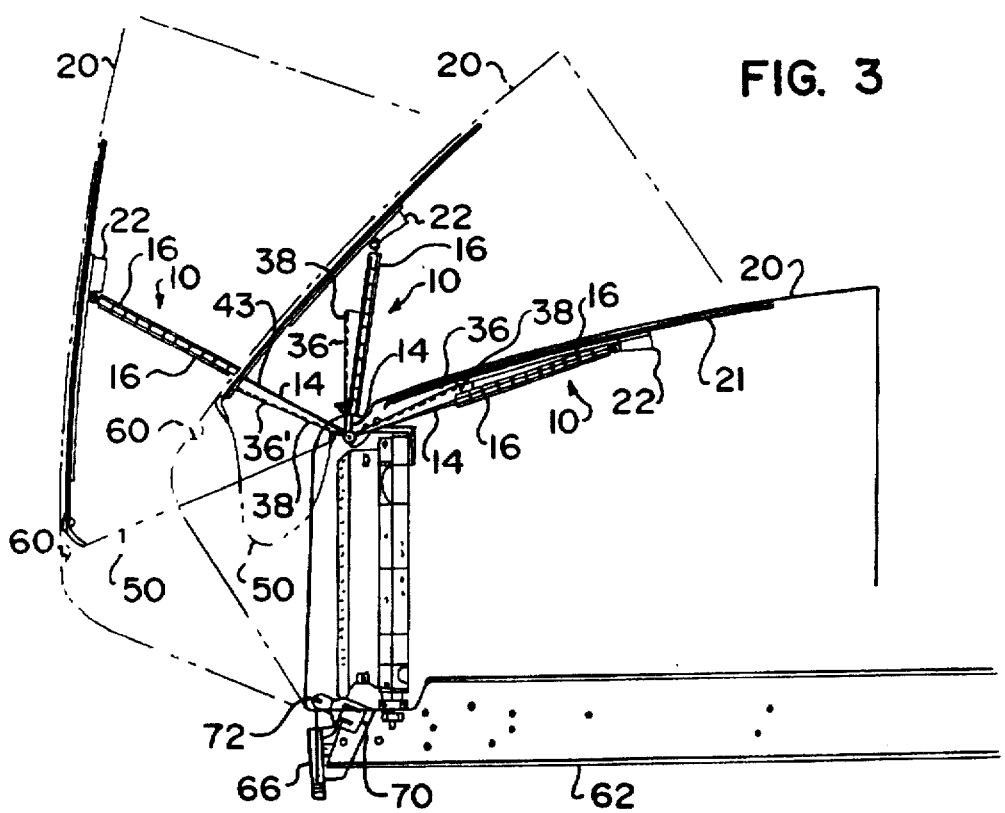
FIG. 3 is a side view through the hood showing the hood control apparatus at various positions thereof during tilting of the hood and showing a secondary embodiment of the dampening cylinder including a locking mechanism.

Thus, during tilting of the hood 20, as shown in FIG. 3, the rod 14 is retracted into the cylinder 16 to the greatest desirable extent when the dampening cylinder 12 is in a nearly vertical or centered orientation, with the rod 14 extending outwardly of the cylinder 16 in a greater degree as the arrangement 12 pivots to either side of the nearly vertical orientation thereof, traveling over center.

Once the hood 20 travels over center in either direction, extension of the rod 14 is controlled by the dashpot in the dampening cylinder and slows the rate of travel of the hood 20 until the rod 14 is fully extended. Additionally, counterbalance springs 30 may be provided between suitably located anchor brackets 31 attached to the hood 20 and the outer sides of the coolant package frame 26 to offset a portion of the weight of the hood.

During the operation of opening of the hood 20, when the rod 14 reaches a fully extended position, the arrangement 12 may serve as a hood stop to limit the open position of the hood 20 and bear the weight thereof, thus eliminating the need for currently used stop cables.

Figure 4:
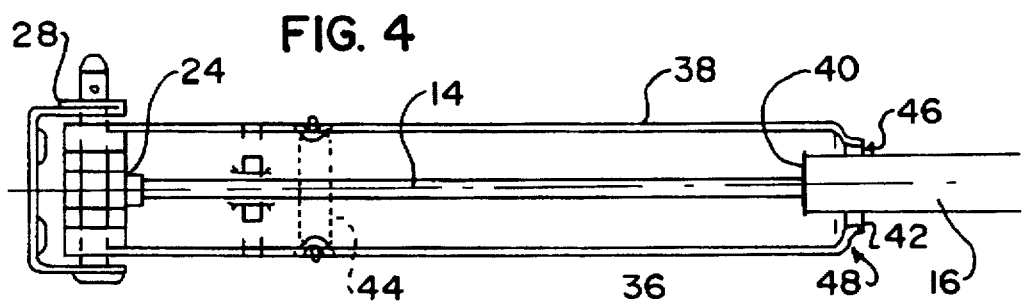
FIG. 4 is an enlarged top view of a portion of the dampening cylinder of FIG. 3 showing the locking mechanism in an unlocked position thereof.
Figure 5:
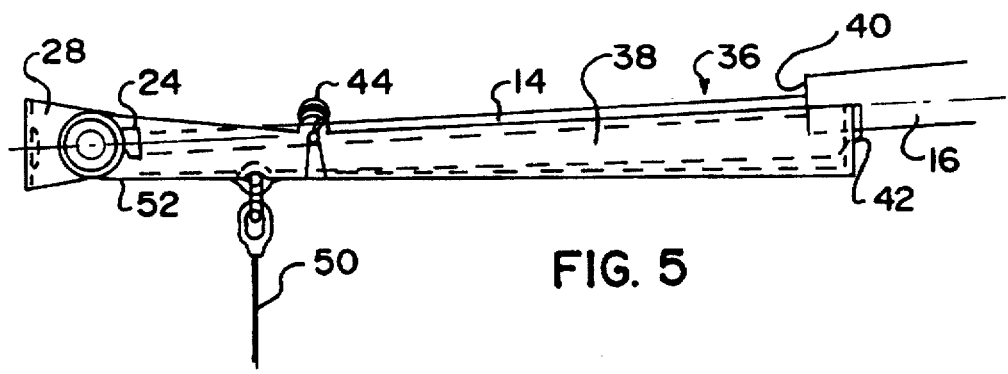
FIG. 5 is a side view of a portion of the dampening cylinder of FIG. 3 showing the locking mechanism in an unlocked position thereof.

In FIGS. 1 and 2, the dampening cylinder 12 is a simple hydraulic dampener. However, in FIG. 3, a locking mechanism 36 is shown incorporated in the cylinder 12 for the purpose of maintenance of the hood 20 in its open position until the operator desires to close the hood. The preferred embodiment of the locking mechanism 36, as shown in FIGS. 3-5, takes the form of a semi-cylindrical steel sleeve 38 which is pivotally engaged to and extends from the free end 24 of the rod 14 and is of such a length that, when the dampening cylinder 12 is at nearly a fully extended position thereof, a free end 42 of the sleeve 38 extends just short of a rod engaging end 40 of the cylinder 16 to permit the end 42 of the cylinder to abut thereagainst as shown at 43 in FIG. 3, thereby preventing retraction of the dampening cylinder 12.

Abutment between the free end 42 of the sleeve 38 and the end 40 of the cylinder 16 may be maintained by a spring 44 engaged to and across the sleeve 38 above the rod 14 in such a manner as to bias the sleeve 38 against the rod 14. However, it should be understood that the spring 44 must be located along a portion of rod 14 which does not retract into the cylinder 16 to prevent interference with the cylinder 16 during opening and closing of the hood 20.

It will also be understood that the sleeve 38 must be of a diameter which is greater than the diameter of the cylinder 16 so that the cylinder 16 can freely move therewithin. The free end 42 of the sleeve 38 therefore must be configured to create a channel 46 therewithin through and within which the cylinder 16 can freely slide while the channel 46 narrows toward the free end 42 so that the cylinder free end 40 can abut thereagainst. This is accomplished by providing a reduced diameter shoulder 48 at the free end 42 of the sleeve 38, the channel 46 being defined therein with a diameter only slightly larger than that of the cylinder 16.

Thus, as the dampening cylinder 12 nears a fully extended position when the hood is moved to its open position, the rod engaging end 40 of the cylinder 16 slips outwardly out of the channel 46 and, under pressure of the spring 44, the sleeve 38 is raised against the rod 14 and the cylinder end 40 engages against the edge 42 of the shoulder 48.

To cause disengagement of the locking mechanism 36, a pull cord 50 is attached to the sleeve 38 as shown, toward the free end 24 thereof, the pull cord 50 being accessible through a hand grab opening 60 in the front of the hood 20.

The pull cord 50 is engaged to the sleeve 38 at an opposed position thereon to the position of the biasing spring 44 such that, when the cord 50 is pulled, the biasing spring 44 is stretched, releasing the sleeve end 42 from abutment against the cylinder end 40, and the cylinder 16 slips back into the channel 46, ready to travel therewithin.

As described above, the hood control apparatus of the invention provides a number of advantages, some of which have been described above and others of which are inherent in the invention. Also, it will be evident to those of skill in the art that modifications may be made to the embodiments of the invention taught herein without departing from the invention. Accordingly, the scope of the invention is only to be limited as necessitated by the accompanying claims.

What is claimed is:

1. In combination with a mobile vehicle chassis of the type having a hood disposed to open forwardly of the vehicle and pivot about a horizontal transverse pivot to expose an engine compartment thereof, a hood control apparatus comprising a dampening cylinder which is resistive to extension and pivotably mounted to a mounting bracket attached to an upper center portion of a cooling package frame mounted in a fixed position on said chassis, said dampening cylinder extending along a longitudinal centerline of said chassis to a pivotal mounting on an underside portion of said hood, said pivotal mounting being disposed in position to maintain said dampening cylinder elevated above said cooling package frame in all positions of movement of said hood, a releasable locking mechanism for locking said dampening cylinder in an extended position, said dampening cylinder more specifically comprising a rod which telescopes in a cylinder, said rod capable of being extended from a rod engaging end of said cylinder, said looking mechanism comprising a sleeve pivotably engaged to said rod of said dampening cylinder and extending about the periphery thereof, said sleeve being capable of abutting said rod engaging end of said cylinder when said rod has extended from said cylinder a predetermined amount, said sleeve is biased toward said rod by a biasing spring, said sleeve has a free end which includes a shoulder, said shoulder defining a channel which has a diameter which is slightly greater than a diameter of said rod, said sleeve is biased against said rod when said rod is fully extended and abuts against said end of said cylinder, and said sleeve has a pull cord attached thereto in a manner which, when pulled, applies an opposing force against biasing by said biasing spring to pull said sleeve shoulder away from said rod.

2. The invention of claim 1 wherein the dampening cylinder is fully extended when the hood is completely open.

3. The invention of claim 1 wherein the dampening cylinder is less than fully retracted when the hood is elevated to a near vertical orientation.

4. The invention of claim 1 wherein said dampening cylinder is less than fully extended when the hood is closed.

5. The invention of claim 1 wherein said mounting bracket and said pivotal mounting are spaced from one another a predetermined distance so that said dampening cylinder cannot fully extend when said hood is in a closed position.

6. The invention of claim 1 wherein said dampening cylinder is more specifically of a hydraulic dash pot design.

7. In combination with a mobile vehicle chassis of the type having a hood disposed to open forwardly of the vehicle and pivot about a horizontal transverse pivot to expose an engine compartment thereof, a hood control apparatus for assisting in tilting of a forward tilt truck hood and for maintaining the hood in an open position thereof comprising a pair of counterbalance springs extending between and secured respectively to said hood and to said chassis, a dampening cylinder comprised of a rod which telescopes in a cylinder, said rod being resistive to extension from a rod engaging end of said cylinder, said dampening cylinder extending along a longitudinal centerline of said chassis and having a cylinder end pivotably mounted to said hood and a rod end of said rod opposite where said rod enters said rod engaging end of said cylinder, said rod end being pivotably mounted to a bracket secured to an upper center portion of a cooling package frame mounted to said chassis in an upright position, a releasable locking mechanism attached to said dampening cylinder and disposed to lock said dampening cylinder in a predetermined extended position thereof, said releasable locking mechanism comprising a sleeve extending about said rod having a length less than the fully extended length of said rod from said cylinder, said sleeve being biased toward said rod by a biasing spring extending past said rod in such a manner that an end of said sleeve abuts against said rod engaging end of said cylinder when said dampening cylinder is fully extended and wherein said sleeve has a pull cord attached thereto in a manner which, when pulled, applies an opposing force against said biasing spring to pull said sleeve away from said rod and thereby permit said dampening cylinder to be contracted by a closing movement of said hood.

8. The invention of claim 7 wherein said dampening cylinder is more specifically of a hydraulic dash pot design.

* * * * *